H. W. CHADBOURNE & A. F. KNIGHT.
STARTING DIRECT CURRENT MOTORS.
APPLICATION FILED APR. 11, 1917.
1,297,096.
Patented Mar. 11, 1919.
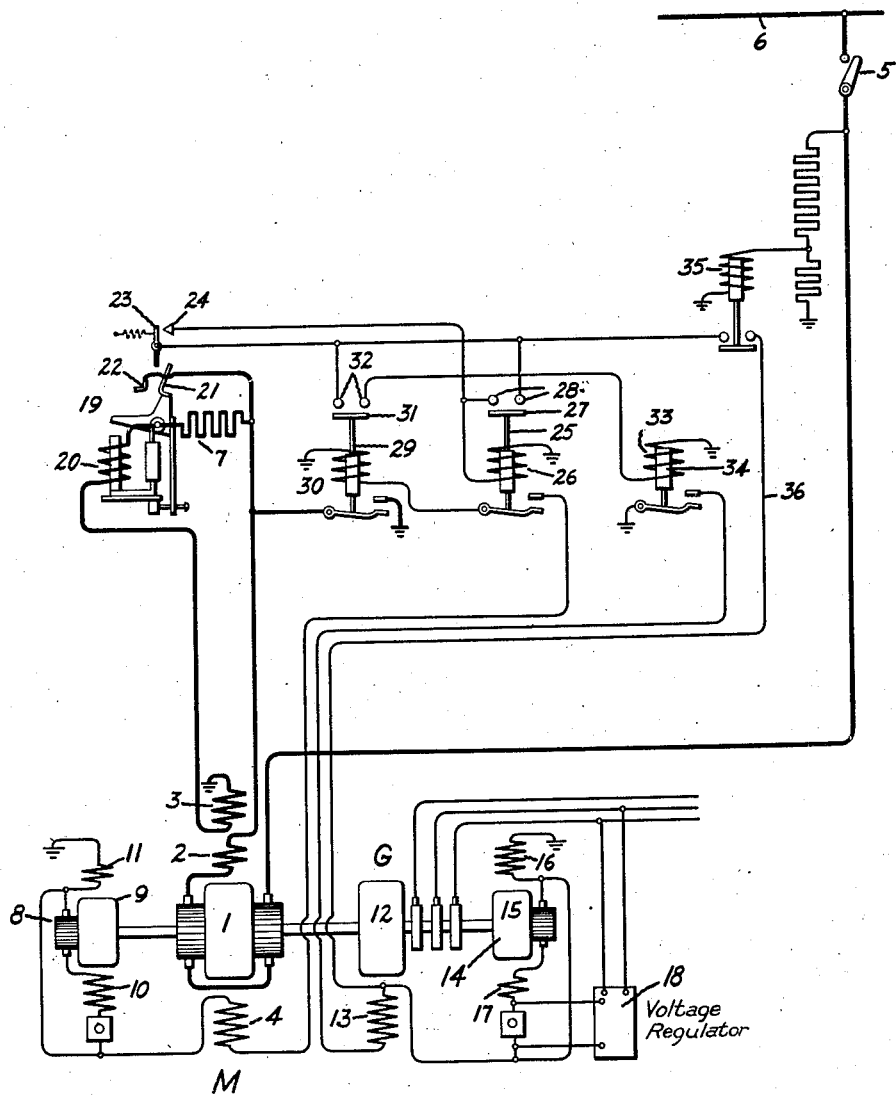
Inventors:
Henry W. Chadbourne,
Arthur F. Knight,
by Albert G. Davis
Their Attorney.

UNITED STATES PATENT OFFICE.

HENRY W. CHADBOURNE AND ARTHUR F. KNIGHT, OF SCHENECTADY, NEW YORK, ASSIGNORS TO GENERAL ELECTRIC COMPANY, A CORPORATION OF NEW YORK.

STARTING DIRECT-CURRENT MOTORS.

1,297,096.

Specification of Letters Patent. Patented Mar. 11, 1919.

Application filed April 11, 1917. Serial No. 161,316.

*To all whom it may concern:*

Be it known that we, HENRY W. CHADBOURNE and ARTHUR F. KNIGHT, citizens of the United States, residing at Schenectady, in the county of Schenectady, State of New York, have invented certain new and useful Improvements in Starting Direct-Current Motors, of which the following is a specification.

Our invention relates to the starting of direct current motors and the object of our invention is to provide means whereby the steps necessary to the starting of a motor, are performed in the proper sequence.

According to our invention we provide a motor with an armature, a series field winding and a field winding which is adapted to be separately excited, means for starting the motor as a series motor by completing a circuit through the armature and series winding thereof, and automatic means for completing a circuit through the second mentioned winding and then short circuiting the series field winding.

For a better understanding of the following detailed description, reference should be had to the accompanying drawing in which the single figure represents diagrammatically our invention as applied to a motor generator set. In said figure, M represents a motor having an armature 1, an inter-pole winding 2, a series field winding 3 and a separately excited field winding 4. The armature 1 is adapted to be connected through a switch 5 to a high voltage supply line 6 and also through the interpole winding 2, the starting resistance 7 and the series winding 3 to ground. The field winding 4 is adapted to be energized by the exciter 8 having an armature 9, a shunt field winding 10 and a series field winding 11. The armature 9 is connected to, and adapted to be driven by, the motor M.

As shown in the drawing, the motor M is connected to, and adapted to drive, the generator G which comprises an armature 12, direct connected to the armature of the motor, and a field winding 13.

An exciter 14 is employed to excite the field winding 13 and also to supply current to operate electromagnetic switches hereinafter described. Any other source of direct current may be used, however. The exciter 14 comprises an armature 15, direct connected to and adapted to be driven by the motor M, a series field winding 16 and a shunt field winding 17.

A voltage regulator 18 may be employed if desired for regulating the voltage of the generator G. The starting resistance 7 is controlled by the relay 19 which is adapted, when the current traversing the winding 20 thereof falls to normal value, to cause the movable contact 21 to engage with the stationary contact 22. The contact 21 is adapted during its movement into engagement with contact 22 to move the contact 23 into engagement with contact 24.

In order to complete the circuit including the field winding 4 an electromagnetic switch 25 is employed, the operating winding 26 of which is energized upon the engagement of contacts 23 and 24. Upon the closing of the electromagnetic switch 25 a holding circuit through the winding 26 thereof is completed through the movable contact 27 and the stationary contacts 28.

In order to short circuit the series field winding 3, of the motor M, an electromagnetic switch 29 is employed, the winding 30 of which is energized upon the operation of the electromagnetic switch 25 to complete the circuit including the field winding 4. The electromagnetic switch 29 carries a contact 31 which engages with stationary contacts 32 to energize the winding 33 of the electromagnetic switch 34 when the electromagnetic switch 29 is closed.

The operation of the electromagnetic switch 34 completes the circuit including the exciter 14 and the field winding 13 of the generator G.

35 represents a no-voltage relay which controls the energization of the electromagnetic switches 25, 29 and 34 from the exciter 14 through the conductor 36.

The exciter 8 will preferably be designed and proportioned so that it will operate over the straight portion of the magnetization curve and so that the field flux thereof will vary substantially in direct proportion to the magnetomotive force developed in its field windings which of course is proportional to the current in said windings. The series field winding 11 of the exciter 8 will preferably be of a size sufficient to effect substantially flat compounding. If the exciter 8 be designed in this way the voltage developed thereby will vary approximately as the square of its speed.

Under some conditions however it may be desired to employ an exciter operating at a higher point on the magnetization curve in which case the shunt winding 10 of the exciter 8 will be made relatively small and the series winding 11 relatively great so that the exciter 8 will operate substantially as a series exciter. With this latter design the voltage developed by the exciter 8 will also vary nearly as the square of the speed.

In starting the motor M the operator will first close the switch 5. Thereupon current from the high voltage line 6 will traverse the armature 1, the interpole winding 2, the starting resistance 7, the operating winding 20 and the series winding 3, and incidentally the no-voltage relay 35 will be closed. The electromagnetic switches 25, 29 and 34 in the meantime remain open. As the motor 1 speeds up the current traversing the winding 20 will decrease and the contact 21 will be caused to engage the contact 22 thereby cutting out the starting resistance 7. When the contact 21 moves into engagement with the contact 22, the contact 23 will be caused to engage with contact 24 whereupon the electromagnetic switch 25 will be closed and the circuit, including the exciter 8, the field winding 4 of the motor M and the winding 30 of the electromagnetic switch 29, will be closed. The closing of the electromagnetic switch 25, as previously described, also closes a holding circuit for itself. The electromagnetic switch 29 will now close due to the energization of the winding 30 thereof and the series winding 3 of the motor M will be short circuited. The closing of the electromagnetic switch 29, as previously described, will cause the energization of the winding 33 of the electromagnetic switch 34. The electromagnetic switches 25, 29 and 34 having been closed in proper sequence, the motor M will now operate with the series field winding 3 ineffective and with the field winding 4 excited from the exciter 8 and the field winding 13 of the generator G will be energized from the exciter 14. While the motor M is illustrated in the drawing as connected to drive the generator G it can of course be employed to drive any sort of a load and any source of voltage, other than the exciter 14, may be employed for the energization of the electromagnetic switches 25 and 34.

The speed of the motor M is maintained approximately constant, notwithstanding variation in the potential of the line 6 and hence variation in the voltage impressed upon the armature of the motor and notwithstanding the load impressed upon the motor, in the following manner:

Assume that, with a certain voltage impressed upon the armature and with a certain motor load, the speed of the motor has a desired value. Now, if the voltage decreases the speed of the motor will tend to decrease but a decrease in the speed of the motor, due to the design and proportions of the motor and of its exciter, will cause a sufficient weakening of the field of the motor to prevent any considerable change in motor speed. Similarly if the voltage increases the speed of the motor will tend to increase but, due to the design and proportions of the motor and of its exciter, the motor field will be strengthened to such an extent that any considerable increase in motor speed is prevented. The coöperation of the motor and exciter to prevent considerable changes in motor speed due to variation in motor load is substantially the same as when the voltage impressed upon the armature of the motor varies.

Due to the regulating action, above indicated, it is possible to maintain the speed of the motor within very narrow limits, or approximately constant, for a range in the motor load from no load to full load and for a very wide variation in the voltage impressed upon the motor armature.

We conceive that various modifications of our invention may be made and we accordingly do not desire to be limited to the exact arrangement herein described and shown but seek to cover in the appended claims all such modifications and arrangements as fall within the scope and spirit of our invention.

What we claim as new and desire to secure by Letters Patent of the United States, is:—

1. The combination with a motor, adapted to be started as a series motor, having an armature, a series field winding and a field winding adapted to be separately excited, means for completing a circuit through said armature and series winding to start said motor and automatic means for completing a circuit through said second mentioned winding and then short circuiting said series winding.

2. The combination with a motor, adapted to be started as a series motor, having an armature, a series field winding and a field winding adapted to be separately excited, a variable source of direct current adapted to be connected to said armature, an exciter adapted to be connected to the second mentioned field winding and to be driven by said motor, means for connecting said source to said armature, and automatic means for completing a circuit through said exciter and the second mentioned field winding and then short circuiting said series field winding.

3. The combination with a motor, adapted to be started as a series motor, having an armature, a series field winding and a field winding adapted to be separately excited, a variable source of direct current adapted to be connected to said armature, an exciter adapted to be connected to the second mentioned field winding and to be driven by said motor, a resistance in series with said field winding, means for connecting said source to said armature, and automatic means for short circuiting said resistance, then completing a circuit including said exciter and the second mentioned field winding and then short circuiting said series field winding.

4. The combination with a motor, adapted to be started as a motor, having an armature, a series field winding and a field winding adapted to be separately excited, a variable source of direct current adapted to be connected to said armature, an exciter adapted to be connected to the second mentioned field winding and to be driven by said motor, a resistance in series with said series field winding, a generator comprising a field winding driven by said motor, a source of direct current for energizing the last mentioned field winding, means for connecting said source to said armature and automatic means for short circuiting said resistance, then completing a circuit including said exciter and the second mentioned field winding, then short circuiting said series field winding and then completing a circuit through the generator field winding and the source of direct current for energizing the same.

In witness whereof, we have hereunto set our hands this 10th day of April, 1917.

HENRY W. CHADBOURNE.
ARTHUR F. KNIGHT.